ACYCLIC HYDROCARBON ALDEHYDE CARBAMOYL OXIMES

Linwood K. Payne, Jr., Charleston, W. Va., and Mathias H. J. Weiden, Raleigh, N.C., assignors to Union Carbide Corporation, a corporation of New York
No Drawing. Filed Sept. 25, 1962, Ser. No. 226,173
5 Claims. (Cl. 260—566)

This invention relates to new chemical compounds and, more particularly, is concerned with carbamate derivatives of trisubstituted acetaldoxime compounds.

The novel compounds of this invention respond to the general formula (I) 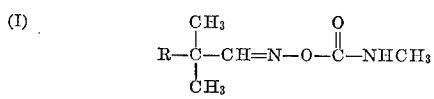

wherein R is acyclic hydrocarbyl, i.e., where R represents an alkyl, alkenyl, or alkynyl radical. In preferred aspect, R contains not in excess of 10 carbon atoms and is saturated or monoolefinic hydrocarbon, and more preferably, R contains from 1 to 6 carbon atoms, inclusive, and is free of acetylenic unsaturation.

As specifically exemplary of our novel compounds there can be mentioned the 2,2-dimethylalkanaldehyde N-methylcarbamoyloximes, such as 2,2-dimethylpropionaldehyde N-methylcarbamoyloxime, 2,2-dimethylbutyraldehyde N-methylcarbamoyloxime, 2,2-dimethylpentanaldehyde N-methylcarbamoyloxime, 2,2-dimethylheptanaldehyde N - methylcarbamoyloxime, 2,2 - dimethyldecanaldehyde N-methylcarbamoyloxime, 2,2-dimethyl-3-methylbutyraldehyde N-methylcarbamate, 2,2,3,3-tetramethylbutyraldehyde N-methylcarbamoyloxime, 2,2-dimethyl-5-ethylheptanaldehyde, and the like, and the 2,2-dimethylalkenaldehyde N-methylcarbamoyloximes, such as 2,2-dimethyl-3-butenaldehyde N-methylcarbamoyloxime, 2,2-dimethyl - 4 - pentenaldehyde N-methylcarbamoyloxime, 2,2-dimethyl-3-pentenaldehyde N-methylcarbamoyloxime, 2,2-dimethyl-5-hexenaldehyde N-methylcarbamoyloxime, 2,2-dimethyl-9-decenaldehyde N-methylcarbamoyloxime, 2,2,3,3-tetramethyl-4-pentenaldehyde N-methylcarbamoyloxime, and the like, as well as the 2,2-dimethylalkynaldehyde N-methylcarbamoyloximes, such as 2,2-dimethyl-3-butynaldehyde N-methylcarbamoyloxime, 2,2-dimethyl-4-pentynaldehyde N-methylcarbamoyloxime, 2,2-dimethyl-3-pentynaldehyde N-methylcarbamoyloxime, 2,2-dimethyl-5-hexynaldehyde N-methylcarbamoyloxime, 2,2-dimethyl - 9 - decynaldehyde N - methylcarbamoyloxime, 2,2,3,3 - tetramethyl - 4 - pentynaldehyde N - methylcarbamoyloxime, and the like.

The compounds of our invention can be prepared in a variety of ways from the corresponding oximes. One synthetic route involves the reaction of the corresponding oxime with phosgene to form the chloroformate which, in turn, is reacted with methylamine to give the desired compound. The synthesis is illustrated by the following general equation wherein R is defined as before.

(1) 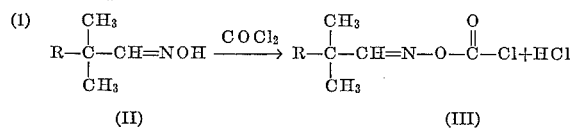

(2) 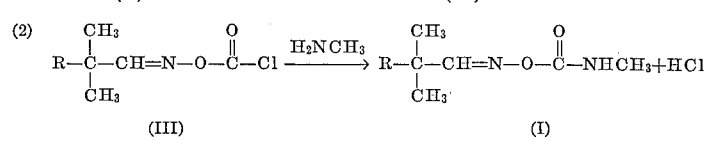

The oxime precursors (II), themselves easily prepared in the usual way from the corresponding aldehydes by addition of hydroxylamine in the presence of potassium carbonate, are reacted with phosgene to yield the corresponding chloroformate (III), as shown in Step 1, above. In Step 1, a solution of the oxime compound (II), in, e.g., diethyl ether is conveniently added dropwise to a solution of phosgene in toluene or diethyl ether in the presence of an HCl acceptor such as dimethyl aniline. The reaction can be carried out at from −30° C. to about 40° C. but will generally be found to proceed most advantageously between 10° C. and room temperature. Below 10° C. the reaction is somewhat sluggish and if the temperature is allowed to rise substantially above 40° C., considerable quantities of nitrile from the dehydration of the oxime compound will appear in the reaction mixture. The reaction is slightly exothermic so that some external cooling is usually necessary to maintain the temperature within the desired range. The reaction mixture can be washed with water to remove the amine hydrochloride and the organic layer containing the chloroformate (III) can be used for further reactions. The addition of methylamine, Step 2 above, is carried out in the presence of solvents for the amine, such as water, dioxane, toluene, or chloroform, at temperatures between about −40° C. and about 80° C., and preferably below about 40° C. inasmuch as the reaction proceeds smoothly even at low temperatures and is so rapid above 40° C. that loss of low boiling amines may occur and some decomposition may take place.

An alternative synthetic route for preparing our compounds from the corresponding oximes involves the addition of methyl isocyanate, as follows:

(3) 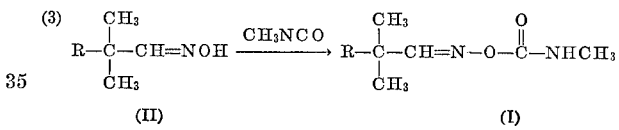

Reaction (3) can be carried out by contacting the oxime (II) with methyl isocyanate in an inert organic solvent, and preferably in the presence of a tertiary amine or organotin catalyst. The reaction may be effected at temperatures ranging from about 10° C. to about 130° C., and is preferably carried out between room temperature and 80° C. Generally, temperatures in excess of about 130° C. are to be avoided in view of the temperature sensitivity of the product carbamoyloxime. The operating pressure may range from about 1 atmosphere to about 10 atmospheres, preferably from about 2 to about 3 atmospheres, and is dependent upon the concentration and vapor pressure of the volatile isocyanate at the reaction temperature. The inert organic solvents that can be employed in the reaction are those inert to isocyanates in general, i.e. those free of radicals such as hydroxy or amino radicals. Illustrative solvents are aliphatic and aromatic hydrocarbons, such as hexane, heptane, octane, benzene, toluene, and the like, and ethers such as diethyl ether, ethyl propyl ether, and the like. The reaction is preferably carried out in the presence of a tertiary amine or organotin catalyst. The term "organotin catalyst" as used herein is meant to refer to such compounds as dibutyltin diacetate, dibutyltin dichloride, dibutyltin dimethoxide, dibutyltin dilaurate, dibutyltin maleate, dibutyltin di-2-ethylhexenoate, stannous octanoate, stannous oleate, and the like. Generally, amounts of said catalyst from about 0.1 to about 1.0 weight percent of the starting material comprised of methyl isocyanate and the oxime are sufficient. The mol ratio of methyl isocyanate to oxime can range from about 0.25:1 to about 2:1, but preferably an equimolar amount or slight excess of methyl isocyanate is employed to insure that the oxime is completely reacted. The reaction time may vary from about 5 minutes to about 7 days, but normally, when operating in the preferred temperature range, reaction times of from about one-half hour to about five hours are sufficient for complete reaction.

The carbamoyloxime product formed either, a solid or oily liquid, can be recovered from the reaction mixture by means known to the art, e.g., by vacuum-distillation to drive off solvent and excess isocyanate.

The following examples are illustrative.

EXAMPLE I

*2,2-dimethylpropionaldehyde N-methylcarbamoyloxime*

To 15 grams (0.149 mole) of trimethylacetaldehyde oxime dissolved in 100 milliliters of anhydrous diethyl ether was added 11.4 grams (0.199 mole) of methyl isocyanate and two drops of dibutyltin diacetate. The mixture was allowed to stand at room temperature for three days. The solvent was evaporated and the residue slowly crystallized to a solid which melted at 70–73° C. and analyzed as follows—

Calculated for $C_7H_{14}N_2O_2$: percent C, 53.2; percent H, 8.9; percent N, 17.7. Found: percent C, 53.0; percent H, 8.9; percent N, 17.6.

EXAMPLE II

*2,2-dimethyl-4-pentenaldehyde N-methylcarbamoyloxime*

To 25 grams (0.197 mole) of 2,2-dimethyl-4-pentenaldoxime dissolved in 100 milliliters of anhydrous diethyl ether was added 14.25 grams (0.25 mole) of methyl isocyanate and two drops of dibutyltin diacetate. The mixture was allowed to stand at room temperature for three days. The ether solution was then washed with water, dried over anhydrous sodium sulfate, filtered and the solvent evaporated. The residue weighed 25 grams $(n\ 30/D—1.4712)$ and analyzed as follows for nitrogen:

Calculated for $C_9H_{16}N_2O_2$: percent N, 15.2. Found: percent N, 15.1.

The compounds of our invention are useful as pesticides, particularly against insects, mites, and nematodes, and may be applied to contact the pest to be destroyed or to exert systemic action.

As illustrative of the compounds within the compass of our invention, the following were tested with regard to their pesticidal activity.

Compound 1—2,2-dimethylpropionaldehyde N-methylcarbamoyloxime

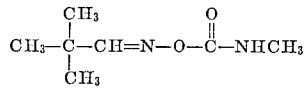

Compound 2—2,2 - dimethyl - 4 - pentenaldehyde N-methylcarbamoyloxime

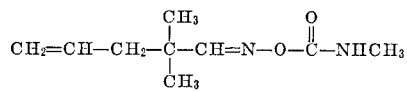

Unless otherwise noted, suspensions of compounds 1 and 2 were prepared by dissolving one gram of compound in 50 milliliters of acetone in which had been dissolved 0.1 gram (10 percent of the weight of compound) of "Triton X-155," an alkylphenoxy polyethoxyethanol surfactant, as an emulsifying or dispersing agent. The resulting solution was mixed into 150 milliliters of ether to give roughly 200 milliliters of a suspension containing the compound in finely divided form. The thus-prepared stock suspension contained 0.5 percent by weight of compound. The test concentrations employed in the tests described hereinbelow were obtained by diluting the stock suspension with water.

The tests employed were as follows:

Aphid foliage spray test

Adults and nymphal stages of the bean aphid (*Aphis fabae* Scop.), reared on potted dwarf nasturtium plants at 65–70° F. and 50–70 percent relative humidity, constituted the test insects. For testing purposes, the number of aphids per pot was standardized to 100–150 by trimming plants containing excess aphids. The test compounds were formulated by diluting the stock suspension with water to give a suspension containing 100 parts of test compound per million parts of final formulation, by weight. The potted plants (one pot per compound tested), infested with 100–150 aphids, were placed on a revolving turntable and sprayed with 100–110 milliliters of test compound formulation by use of De Vilbiss sray gun set at 40 p.s.i.g. air pressure. This application, which lasted 30 seconds, was sufficient to wet the plants to run-off. As a control, 100–110 milliliters of a water acetone emulsifier solution containing no test compound were also sprayed on infested plants. After spraying, the pots were placed on their sides on a sheet of white standard mimeograph paper which had been previously ruled to facilitate counting. Temerature and humidity in the test room during the 24-hour holding period were 65–70° F. and 50–70 percent, respectively. Aphids which fell onto the paper and were unable to remain standing after being uprighted were considered dead. Aphids remaining on the plants were observed closely for movement and those which were unable to move the length of the body upon stimulation by prodding were considered dead. Each compound was rated according to the following numerical designations:

5=80–100% mortality
3=40–79% mortality
1=0–39% mortality

Mite foliage spray test

Adults and nymphal stages of the two-spotted mite (*Tetranychus telarius* (L.)), reared on Tendergreen bean plants at 80±5° F. and 50±5 percent relative humidity, were the test organisms. Infested leaves from a stock culture were placed on the primary leaves of two bean plants six to eight inches in height, growing in a two-and-a-half inch clay pot. 150–200 mites, a sufficient number for testing, transferred from the excised leaves to the fresh plants in a period of twenty-four hours. Following the twenty-four hour transfer period, the excised leaves were removed from the infested plants. The test compounds were formulated by diluting the stock suspension with water to give a suspension containing 1000 parts of test compound per million parts of final formulation. The potted plants (one pot per compound) were placed on a revolving turntable and sprayed with 100–110 milliliters of test compound formulation by use of a De Vilbiss spray gun set at 40 p.s.i.g. air pressure. This application, which lasted 30 seconds, was sufficient to wet the plants to run-off. As a control, 100–110 milliliters of a water solution containing acetone and emulsifier in the same concentrations as the test compound formulation, but containing no test compound, were also sprayed on infested plants. The sprayed plants were held at 80±5° F. and 50±5 percent relative humidity for six days, after which a mortality count of motile forms was made. Microscopic examination for motile forms was made on the leaves of the test plants. Any individual which was capable of locomotion upon prodding was considered living. Each compound was then rated according to the following designations:

5=80–100% mortality
3=40–79% mortality
1=0–39% mortality

*Mite systemic test*

Adults and nymphal stages of the two-spotted mite (*Tetranychus telarius* (L.)), reared on Tendergreen bean plants at 80±5° F. and 50±5 percent relative humidity, were the test organisms. Infested leaves from a stock culture were placed on the primary leaves of two bean plants six to eight inches in height, growing in a two-and-a-half inch clay pot. 150–200 mites, a sufficient number for testing, transferred from the excised leaves to the fresh plants in a period of twenty-four hours. The test compounds were formulated by diluting the stock suspension with water to give a suspension containing 250 parts of test compound per million parts of final formulation. The infested plants are excised and the stems placed in the test formulations. The test formulations containing the excised plants were held for forty-eight hours at 80±5° F. and 50±5 percent relative humidity. After the forty-eight hour holding period, microscopic examination for motile forms was made on the leaves of the excised plants. Any individual capable of locomotion upon prodding was considered living. Each test compound was then rated according to the following designations:

5=80–100% mortality
3=40–79% mortality
1=0–39% mortality

*Mexican bean beetle leaf dip test*

Third instar larvae of the Mexican bean beetle (*Epilachna varivestis*, Muls.), reared on Tendergreen bean plants at a temperature of 80±5° F. and 50±5 percent relative humidity, were the test insects. The test compounds were formulated by diluting the stock suspension with water to give a suspension containing 100 parts of test compound per million parts of final formulation by weight. Paired seed leaves excised from Tendergreen bean plants were dipped in the test formulation until thoroughly wetted, excess liquid being removed by gentle shaking. While the leaves were drying under a hood, wilting was prevented by placing the stems in water. When dry, the paired leaves were separated and each was placed in a 9-centimeter Petri dish lined with moistened filter paper. Four randomly selected larvae were introduced into each dish, and the dishes were closed. The closed dishes were labeled and held at a temperature of 80±5° F. for three days. Although the larvae could easily consume the leaf within 24 to 48 hours, no more food was added. Larvae which were unable to move the length of the body, even upon stimulation, were considered dead. Each compound was rated according to the following designations:

5=80–100% mortality
3=40–79% mortality
1=0–39% mortality

*Fly bait test*

Four to six day old adult house flies (*Musca domestica*, L.), reared according to the specifications of the Chemical Specialties Manufacturing Association (Blue Book, MacNair-Dorland Co., N.Y. 1954: pages 243–244, 261) under controlled conditions of 80±5° F. and 50±5 percent relative humidity, were the test insects. The flies were immobilized by anesthetizing with carbon dioxide and twenty-five immobilized individuals, males and females, were transferred to a cage consisting of a standard food strainer about five inches in diameter which was inverted over blotting paper. The test compounds were formulated by diluting the stock suspension with a 10 percent (by weight) sugar solution to give a suspension containing 1000 parts of test compound per million parts of final formulation, by weight. Fifteen milliliters of the test formulation were added to a soufflé cup containing a one-inch square of an absorbent pad. This bait cup was introduced and centered on the blotting paper under the food strainer prior to admitting the flies. The caged flies were allowed to feed on the bait for twenty-four hours, at a temperature of 80±5° F. and the relative humidity of 50±5 percent. Flies which showed no sign of movement on prodding were considered dead. Each compound was rated according to the following designations:

5=80–100% mortality
3=40–79% mortality
1=0–39% mortality

Each of compounds 1 and 2 exhibited activity on each of the above-described tests. To determine the concentration of compound required to kill 50 percent of the insect or mite population in each of the above-described tests, serial dilution tests were conducted. This concentration, expressed in parts of test compound per million parts of applied formulation, is hereinafter abbreviated as $LD_{50}$. The results are set forth in Table I, below.

TABLE I

| Compound | $LD_{50}$ Values | | | | |
| --- | --- | --- | --- | --- | --- |
| | Insect | | | Mite | |
| | Aphid | Mexican Bean Beetle | Fly Bait | Foliage | Systemic |
| 1 | 10 | 80 | 30 | 800 | 30 |
| 2 | 20 | ~200 | 68 | ~1000 | 190 |

Our compounds were also found to possess nematocidal activity, as evidenced by the following test.

*Nematocide test*

Infective migratory larvae of the root-knot nematode (*Meloidogyne incognita*, var. *acrita*), reared in the greenhouse on roots of Coleus plants constituted the test organism. Infected tomato plants were removed from the culture and the roots were chopped very finely. A small amount of these choppings was added to a pint Mason jar containing approximately 180 cubic centimeters of soil. The jar was capped and incubated for one week at room temperature. During the incubation period eggs of the nematode hatch and the larval forms migrate into the soil. The test compounds were formulated by diluting the stock suspension with water to give a suspension containing 1000 parts of test compound per million parts of final formulation. Twenty-five milliliters of the test formulation were added to each of two jars. Thus each jar contained 25 milligrams of test compound, an amount roughly equivalent to 75 pounds per acre. Following the introduction of the test formulation, the jars were capped and the contents thoroughly mixed on a ball mill for five minutes. The jars remained capped at room temperature for 48 hours whereupon the contents were transferred to 3-inch pots. These pots were then seeded with cucumber as an indicator crop and placed in the greenhouse where they were cared for in the usual fashion for approximately three weeks. The cumber plants were removed from the pots and the soil was washed from the roots. The amount of galling was determined by visual inspection and rated according to the following designations:

5=no galling; perfect control
4=very light galling
3=light galling
2=moderate galling
1=severe galling, equal to untreated plants Compounds 1 and 2 both received a 5 rating.

The compounds contemplated in this invention may be applied as insecticides, miticides, and nematocides according to methods known to those skilled in the art. Pesticidal compositions containing the compounds as the active toxicant will usually comprise a carrier or diluent, either liquid or solid.

Suitable liquid diluents or carriers include water, petroleum distillates, or other liquid carriers with or without surface active agents. Liquid concentrates may be prepared by dissolving one of these compounds with a non-phytotoxic solvent such as acetone, xylene, or nitrobenzene and dispersing the toxicants in water with the aid of suitable surface active dispersing agents.

The choice of dispersing and emulsifying agent and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fuller's earth, and the like. In the formulation of the wettable powdess the aforementioned dispersing agents as well as lignosulfonates can be included.

The required amount of the toxicants contempelated herein may be applied per acre treated in from 1 to 200 gallons or more of liquid carrier diluent or in from about 5 to 500 pounds of inert solid carrier or diluent. The concentration in the liquid conrentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

The pesticides contemplated herein prevent attack by insects, mites, and nematodes upon plants or other material to which the pesticides are applied, and they have high residual toxicity. With respect to plants they have a high margin of safety in that when used in sufficient amount to kill or repel the insects, they do not burn or injure the plant, and they resist weathering which includes wash-off caused by rain, decomposition by ultra-violet light, oxidation, or hydrolysis in the presence of moisture or, at least, such decomposition, oxidation, and hydrolysis as would materially decrease the desirable insecticidal characteristic of the toxicants or impart undesirable characteristics, for instance, phytotoxicity, to the toxicants. The toxicants are so chemically inert that they are compatible with substantially any other constituents of the spray schedule, and they may be used in the soil, upon the seeds, or the roots of plants without injuring either the seeds or roots of plants, yet by imbibition or root uptake they will kill the pests feeding thereon.

What is claimed is:
1. A compound of the formula

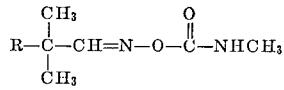

wherein R is saturated and monoolefinic hydrocarbon of up to 10 carbon atoms, inclusive.

2. 2,2-dimethylalkanaldehyde N-methylcarbamoyloxime wherein the alkanaldehyde moiety contains up to 6 carbon atoms, inclusive.

3. 2,2 - dimethylalkenaldehyde N-methylcarbamoyloxime wherein the alkenaldehyde moiety contains up to 6 carbon atoms, inclusive.

4. 2,2 - dimethylpropionaldehyde N-methylcarbamoyloxime.

5. 2,2-dimethyl-4-pentenaldehyde N-methylcarbamoyloxime.

References Cited by the Examiner

UNITED STATES PATENTS

| | | | |
|---|---|---|---|
| 2,974,082 | 3/1961 | Collins | 167—22 |
| 2,988,472 | 6/1961 | D'Amico | 17—22 |
| 3,040,097 | 6/1962 | Bachmann | 260—566 |
| 3,063,823 | 11/1962 | Kuhle et al. | |
| 3,117,987 | 1/1964 | Horrom | 260—566 |
| 3,123,639 | 3/1964 | Bachmann | 260—566 |

CHARLES B. PARKER, *Primary Examiner.*

JULIAN S. LEVITT, *Examiner.*

ROBERT V. HINES, *Assistant Examiner.*